Nov. 21, 1939.  M. A. HOPKINS  2,180,959
STORAGE BATTERY CONSTRUCTION
Filed Jan. 17, 1936   2 Sheets-Sheet 1

INVENTOR
Mark A. Hopkins
BY
ATTORNEY

Nov. 21, 1939.   M. A. HOPKINS   2,180,959
STORAGE BATTERY CONSTRUCTION
Filed Jan. 17, 1936   2 Sheets-Sheet 2
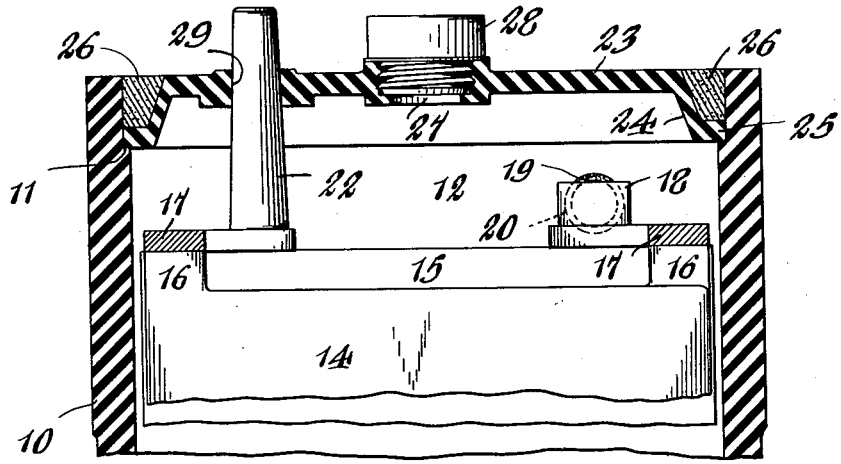
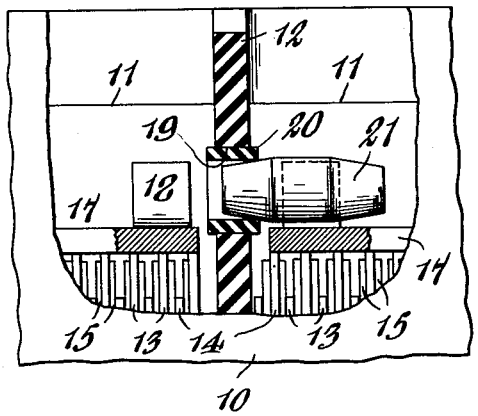
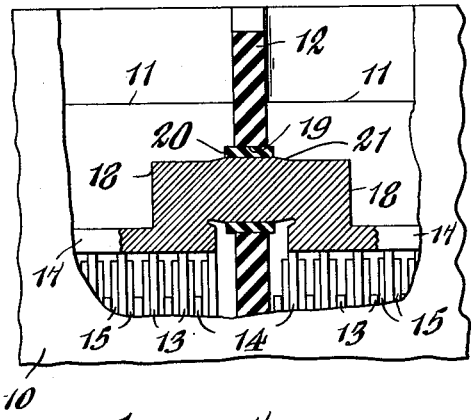
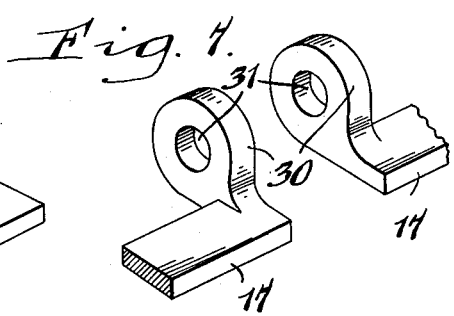
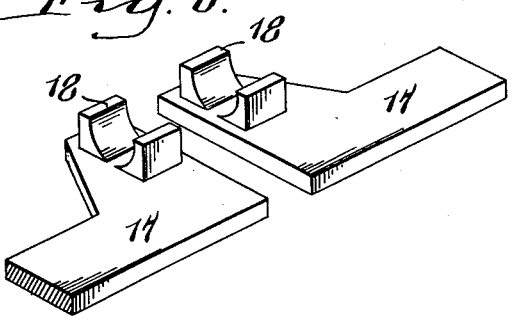
INVENTOR
Mark A. Hopkins
BY
ATTORNEY Patented Nov. 21, 1939

2,180,959

UNITED STATES PATENT OFFICE 2,180,959

STORAGE BATTERY CONSTRUCTION

Mark A. Hopkins, Indianapolis, Ind., assignor to Prest-O-Lite Storage Battery Corporation, Speedway, Ind., a corporation of Indiana Application January 17, 1936, Serial No. 59,588

2 Claims. (Cl. 136—134)

This invention relates to storage batteries and more particularly to improvements in the construction of intercell electrical connections for multi-cellular batteries.

In the storage batteries in common use for automotive starting and lighting purposes, intercell connections are effected by a connecting conductor welded to the exposed portion of adjacent positive and negative cell posts. These exposed cell posts and connecting conductors provide a circuitous route for the current to follow, thereby increasing the internal resistance of the battery, especially at high rates of discharge. Moreover, they increase the possibility of discharge, either through an accidental short-circuit or by current leakage across the exterior surface of the battery cover, between positive and negative cell posts.

An object of my invention is to provide a storage battery in which the intercell connections are effected within the battery container.

A further object of my invention is to provide an intercell connection of low electrical resistance.

A further object of my invention is to provide for a storage battery an intercell connection which can be simply, quickly and cheaply constructed.

A further object is to provide a novel inexpensive method of forming intercell connections.

A further object is to provide a storage battery with a minimum number of projections through battery covers, thereby improving the appearance and reducing the possibility of acid seepage.

A further object of my invention is to provide a resilient support for the battery elements, thereby enabling the battery to withstand shock and vibration to a greater degree.

A further object is to provide an intercell connection which is partially or completely submerged by the battery electrolyte, thereby preventing excessively high temperature rise in the connector.

A further object is to provide a storage battery having intercell connections employing a lesser amount of conducting material which is subjected to a temperature-controlling means, thereby permitting the flow of an abnormally high current without injury to said connections.

A further object is to provide a shorter intercell connection, thereby increasing the voltage output.

In the accompanying drawings which illustrate but one embodiment of my invention—

Fig. 3 is an end section along line 3—3 of Fig. 2;

Fig. 4 is a detailed sectional view of the intercell connection before insertion of the connector;

Fig. 5 is a detailed sectional view of the intercell connection after insertion and burning of the connector;

Fig. 6 is a perspective view of the cell posts, and

Fig. 7 is a perspective view of a modified form of cell posts.

Figure 1:
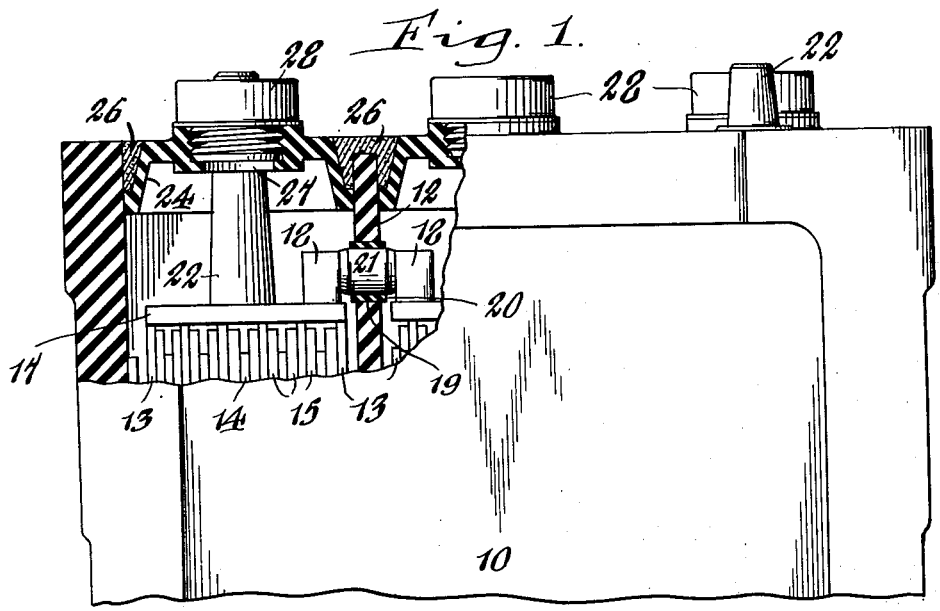
Fig. 1 is a side elevation of a battery partly in section.
Figure 2:
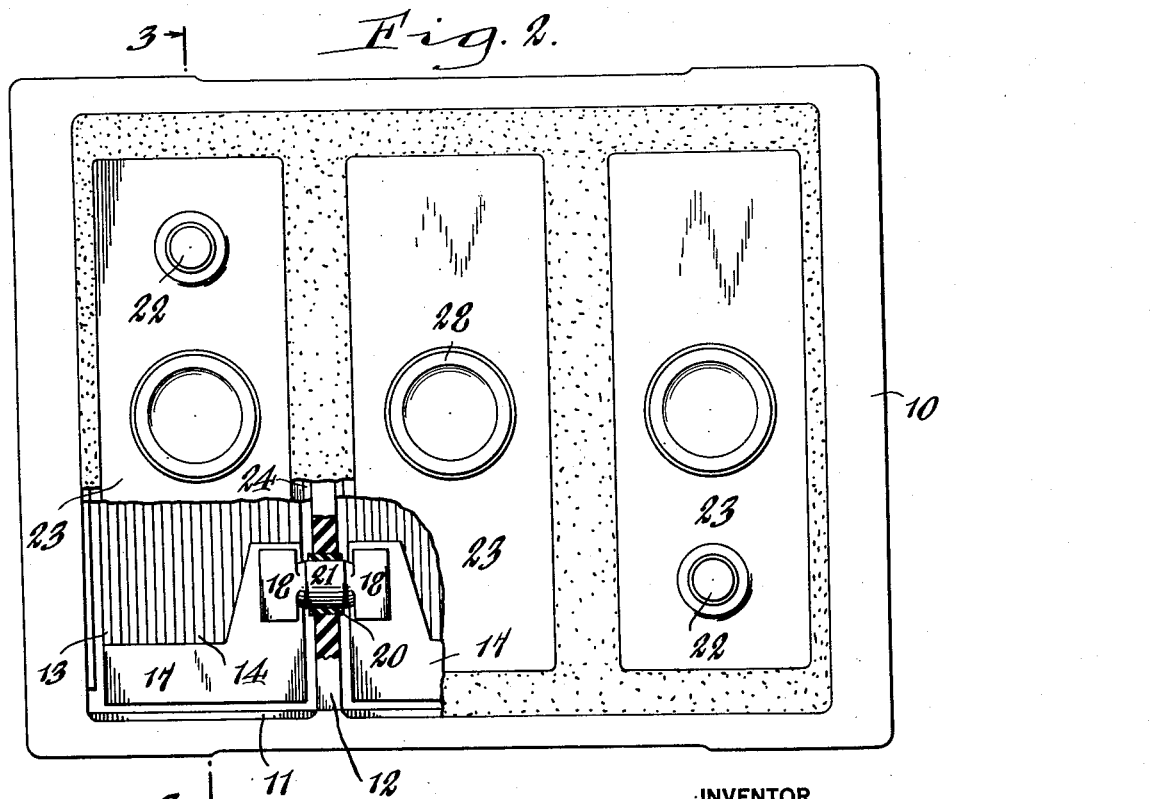
Fig. 2 is a top plan view.

Reference numeral 10 designates the storage battery casing or container, having upwardly facing ledges 11 in the upper portion of the side walls thereof, and partitions 12 dividing the container into a number of chambers. The container 10 and partitions 12 may be integrally molded from any suitable insulating acid-resisting material. Each of the chambers contains a plurality of negative plates 13 and positive plates 14 arranged alternately in the customary manner. Each plate is insulated from the adjacent plates by separators 15 of wood or other suitable insulating material having sufficient porosity to permit of rapid diffusion of the battery electrolyte.

Extending upwardly from the upper edge of each plate and spaced from the center thereof, is a lug 16. The plates of opposite polarity are so arranged that their lugs lie on opposite sides of the longitudinal axis of the container and at equal distances therefrom. Post straps 17 serve to connect plates of like polarity in the usual manner by being welded to the lugs thereof. A cell post 18 is formed integrally with each strap 17 and extends upwardly therefrom. Said cell posts are preferably U-shaped but they may be of any suitable configuration. Cell posts 18 are so arranged that when the elements are assembled into the cell chambers a post 18 will extend upwardly near each side of a partition 12 and the depressions in the cell posts will be in registry with aperture 19 formed in each partition. The posts on opposite sides of each partition will be of opposite polarity. A soft gum rubber sleeve or bushing 20 is cemented in aperture 19.

Intercell connection is effected by means of a connector 21 preferably made of lead which extends through bushing 20 and is united at each end to a post 18 by being welded or burned thereto. It should be noted that the inside diameter of bushing 20 is slightly less than the diameter of connector 21. The preferred manner of forming such a connection is illustrated in Figs. 4 and 5. As shown in Fig. 4, connector 21 in its original form is in the shape of a cylinder having both ends tapered. The connector is pressed into a midway position with respect to bushing 20. A coating of rubber cement may be employed to lubricate the connector. In this position the flat central portion of the connector will be in contact with the inner surface of bushing 20, and because of the greater diameter of said portion, the bushing will be tightly compressed between said portion and the wall of aperture 19 in which the bushing is secured. The connector is preferably of circular cross section so that it will exert equal pressure in all directions on the soft rubber bushing. Thus it will be apparent that a tight seal is formed between the wall of aperture 19 and the outer surface of bushing 20, and also between the inner surface of bushing 20 and the connector 21. It will be further noted that the ends of the bushing extend beyond the partition surfaces, thereby effecting a better seal. The ends of connector 21 are then united to posts 18 by being lead burned thereto in a suitable mold. It will be understood that terminal posts 22, one of which is provided at each end of the battery, are connected to their respective straps and extend upwardly through the cell cover in the usual manner.

In this particular exemplification of my invention, I have chosen a separate cover 23 for each cell, although one of the features of this intercell connection is that it permits the use of a single cover to seal all cells. Each cover 23 has depending from it downwardly inclined side and end walls 24 on the lower and outer surface of which is provided a bead or flange 25. The cover 23 is adapted to fit in the upper portion of the cell, resting upon supporting ledge 11, the bead 25 being in contact with the cell walls. The downwardly inclined walls 24 of each cover cooperate with the upper portion of the cell walls to form a groove adapted to receive sealing compound 26. Each cover is provided with an aperture 27 adapted to receive vent plug 28. The end cell covers are provided with apertures 29 through which battery terminal posts 22 extend in tight engagement therewith.

As an alternative construction, aperture 19 in partition 12 may be formed in close proximity above post strap 17, and cell post 18 omitted, the connector 21 being burned directly to post strap after it has been inserted in the aperture, as above described.

Another alternative is shown in Fig. 7, in which the saddle, or U-shaped cell post 18, is replaced by a disc-shaped cell post 30, having therein central aperture 31. The diameter of aperture 31 is greater than that of connector 21 to allow it to pass freely therethrough. After the connector has been inserted through aperture 31 of either cell post, and pressed into a midway position with respect to bushing 20, each end thereof may be burned to the cell post surrounding it.

It will be understood that each cell is filled with an electrolyte so that plates 13 and 14 and connector 21 are submerged.

From the above description, the advantages of my invention are apparent. The intercell connection is sealed against acid seepage from one cell to another. The connection is quickly and cheaply made by the single operation of burning the lead connector to the cell post or strap. The appearance of the battery is improved by the elimination of the exposed cell posts and connecting links; the possibility of acid seepage on to the cover is reduced thereby; and the amount of lead going into the construction of the battery is reduced. The connection being more direct, its resistance is less than in former modes of construction; consequently, the capacity of the battery is increased.

Furthermore, the connector being below the normal level of the battery electrolyte, excessive heat therein is conducted away by the electrolyte, and the resistance of the connector at a high rate of discharge is decreased.

It is to be understood that the above described embodiment of the invention is not intended to restrict the invention to the precise details shown, except as limited by the appended claims.

What I claim as new and desire to secure by Letters Patent of the United States is:

1. In a storage battery, a container, an insulating partition dividing said container into cells, an electrical conductor tapered at both ends and having a central cylindrical portion passing through said insulating partition, and a resilient impervious laterally compressed sleeve interposed between said central cylindrical portion of said conductor and said partition.

2. In a storage battery, a container, an insulating partition dividing said container into cells, an electrical conductor tapered at both ends and having a central cylindrical portion passing through said insulating partition, and a resilient impervious uniformly laterally compressed sleeve interposed between said central cylindrical portion of said conductor and said partition and cemented to said conductor and said partition.

MARK A. HOPKINS.